United States Patent [19]

Waclawsky et al.

[11] Patent Number: 5,495,426
[45] Date of Patent: Feb. 27, 1996

[54] INBAND DIRECTED ROUTING FOR LOAD BALANCING AND LOAD DISTRIBUTION IN A DATA COMMUNICATION NETWORK

[76] Inventors: John G. Waclawsky, 6105 Spring Meadow La., Frederick, Md. 21701-5819; Paul C. Hershey, 7612 Michelle Ct., Manassas, Va. 22110

[21] Appl. No.: 188,166

[22] Filed: Jan. 26, 1994

[51] Int. Cl.⁶ .................................... H04J 3/26
[52] U.S. Cl. .................... 364/514 C; 370/17; 370/60; 370/94.1
[58] Field of Search ................ 364/514, DIG. 1, 364/242.94, 281.3, 281, DIG. 2, 940.62; 395/200, 650; 370/17, 60, 85.7, 85.9, 94.1, 94.3, 95.1, 60.1

[56] References Cited

U.S. PATENT DOCUMENTS

| | | | |
|---|---|---|---|
| 4,227,245 | 10/1980 | Edbland et al. | 364/468 |
| 4,458,309 | 7/1984 | Wilder, Jr. | 395/575 |
| 4,459,656 | 7/1984 | Wilder, Jr. | 395/550 |
| 4,521,849 | 6/1985 | Wilder, Jr. | 395/575 |
| 4,779,194 | 10/1988 | Jennings et al. | 395/650 |
| 4,805,089 | 2/1989 | Lane et al. | 364/188 |
| 4,851,998 | 7/1989 | Hospodor | 364/580 |
| 4,905,171 | 2/1990 | Kiel et al. | 364/551.01 |
| 4,939,724 | 7/1990 | Ebersole | 370/85.15 |
| 4,944,038 | 7/1990 | Hardy et al. | 370/85.5 |
| 4,980,824 | 12/1990 | Tulpule et al. | 395/650 |
| 5,029,164 | 7/1991 | Goldstein et al. | 370/95.1 |
| 5,031,089 | 7/1991 | Liu et al. | 395/200.06 |
| 5,035,302 | 7/1991 | Thangavelu | 187/382 |
| 5,062,055 | 10/1991 | Chinnaswamy et al. | 364/551.01 |
| 5,067,107 | 11/1991 | Wade | 395/500 |
| 5,072,376 | 12/1991 | Ellsworth | 395/650 |
| 5,077,763 | 12/1991 | Gagnoud et al. | 377/16 |
| 5,079,760 | 1/1992 | Nemirovsky et al. | 370/17 |
| 5,084,871 | 1/1992 | Carn et al. | 370/94.1 |
| 5,282,202 | 1/1994 | Bernstein et al. | 370/94.1 |
| 5,283,788 | 2/1994 | Morita et al. | 370/110.1 |
| 5,313,454 | 5/1994 | Bustini et al. | 370/13 |
| 5,353,412 | 10/1994 | Douglas et al. | 395/325 |

FOREIGN PATENT DOCUMENTS 61-53855  3/1986  Japan.

Primary Examiner—Emanuel T. Voeltz
Assistant Examiner—Kyle J. Choi
Attorney, Agent, or Firm—John E. Hoel; Joseph C. Redmond, Jr.

[57] ABSTRACT

A dynamic realtime, inband routing mechanism is disclosed for a data communications network, which provides an Event Driven Interface to perform realtime, inband directed routing for load distribution and load balancing of data frames over one of a plurality of destination paths. The Event Driven Interface is programmed with control vectors to identify load balancing and load distribution bit patterns in the data frames on the data communications network. Enabling signals produced by the Event Driven Interface are applied to the control input of a multiplexer whose data input is connected to the data communications network. The multiplexer will steer the data frames from the data communications network to one of a plurality of output alternative routing paths, in response to the enabling signals it receives from the Event Driven Interface.

10 Claims, 3 Drawing Sheets

PATHS: A→B→D; A→B→C→D; A→C→D; A→C→B→D

```
                                         TIME
PACKET 1                         0  0      |
PACKET 2                         0  0      |
PACKET 3                         0  0      |
PACKET 4                         0  0      |
NOTIFICATION THAT NODE B IS CONGESTED      |
PACKET 5                         1  1      |
PACKET 6                         1  1      |
PACKET 7                         1  1      |
PACKET 8                         1  1      |
NOTIFICATION THAT NODE B IS UNDER UTILIZED |
PACKET 9                         0  0      ↓
  |
  |
ETC.
```

PATHS: A→B→D; A→B→C→D; A→C→D; A→C→B→D

| | | | |
|---|---|---|---|
| PACKET 1 | | 0 | 0 |
| PACKET 2 | | 0 | 0 |
| PACKET 3 | | 0 | 0 |
| PACKET 4 | | 0 | 0 |
| NOTIFICATION THAT NODE B IS CONGESTED | | | |
| PACKET 5 | | 1 | 1 |
| PACKET 6 | | 1 | 1 |
| PACKET 7 | | 1 | 1 |
| PACKET 8 | | 1 | 1 |
| NOTIFICATION THAT NODE B IS UNDER UTILIZED | | | |
| PACKET 9 | | 0 | 0 |

TIME

ETC.

SCHEMATIC DIAGRAM OF EDI
WITH MULTIPLEXER

INBAND DIRECTED ROUTING FOR LOAD BALANCING AND LOAD DISTRIBUTION IN A DATA COMMUNICATION NETWORK

BACKGROUND OF THE INVENTION

1. Technical Field

The invention disclosed broadly relates to network routing activities based on the extraction of information from large bodies of data for high speed communication facilities, and more particularly relates to the inband directed routing for load balancing and load distribution of data frames in a data communications network.

2. Related Patent Applications

This patent application is related to the U.S. patent application Ser. No. 08/024,572, filed Mar. 1, 1993, entitled "Information Collection Architecture and Method for a Data Communications Network," by J. G. Waclawsky, et al., (now U.S. Pat. No. 5,375,070 issued Dec. 24, 1994 and) assigned to the IBM Corporation and incorporated herein by reference.

This patent application is also related to the U.S. patent application Ser. No. 08/024,575, filed Mar. 1, 1993, entitled "Event Driven Interface for a System for Monitoring and Controlling a Data Communications Network," by P. C. Hershey, et al., (now U.S. Pat. No. 5,365,514 issued Nov. 15, 1994 and) assigned to the IBM Corporation and incorporated herein by reference.

This patent application is also related to the copending U.S. patent application Ser. No. 08/024,542, filed Mar. 1, 1993, entitled "System and Method for Configuring an Event Driven Interface and Analyzing Its Output for Monitoring and Controlling a Data Communications Network," by J. G. Waclawsky, et al., assigned to the IBM Corporation and incorporated herein by reference.

This patent application is also related to the copending U.S. patent application Ser. No. 08/138,045, filed Oct. 15, 1993, entitled "System and Method for Adaptive, Active Monitoring of a Serial Data Stream Having a Characteristic Pattern," by P. C. Hershey, et al., assigned to the IBM Corporation and incorporated herein by reference.

This patent application is also related to the copending U.S. patent application Ser. No. 08/187,949, filed Jan. 26, 1994, entitled "Dynamic Realtime Routing in a Data Communications Network," by J. G. Waclawsky, et al., assigned to the IBM Corporation and incorporated herein by reference.

3. Background Information

This invention is related to the copending U.S. patent application Ser. No. 08/024,575, filed Mar. 1, 1993 entitled "Event Driven Interface for a System for Monitoring and Controlling a Data Communications Network," by P. C. Hershey, et al., assigned to the IBM Corporation and incorporated herein by reference.

The above cited copending patent application by Hershey, et al. describes the Event Driven Interface which is a mechanism for identifying bit patterns in the serial bit stream of a data communications network. The Event Driven Interface performs pattern recognition based upon a program defined by control vectors. The Event Driven Interface has an input connected to the data communications network for receiving the serial bit stream and for performing a logical pattern recognition on the serial bit stream to produce event vector signals as an output in response to the identification of specific, predefined patterns in the bit stream.

It would be useful to apply the realtime pattern recognition capability of the Event Driven Interface, to the problem of efficient load distribution and load balancing of data frames and other portions of the serial bit stream in the data communications network.

OBJECTS OF THE INVENTION

It is therefore an object of the invention to efficiently perform load distribution and load balancing of data frames in a data communications network.

It is still another object of the invention to perform load distribution and load balancing using a minimum number of bits to route serial bit streams in a data communications network.

SUMMARY OF THE INVENTION

These and other objects, features and advantages are accomplished by the invention. The invention is the use of an Event Driven Interface to perform load distribution and load balancing by dynamically altering the selection of routes in a data communications network. The data communications network will transmit data frames which include load distribution and load balancing information in a segment of the data frame. The Event Driven Interface has an input connected to the network for receiving the serial bit stream and for performing pattern recognition on the serial bit stream based upon a programmed set of logic paths defined by control vectors. In accordance with the invention, a plurality of programmed logic paths in the Event Driven Interface produce corresponding output enabling signals which are applied as the steering signals to a multiplexer. Each packet has a flag field with bit capacity to match the maximum number of potential paths that a packet can take. Because an Event Driven Interface (EDI) is pre-configured with all possible path alternatives, only a specific path characteristic pattern is required to enable the EDI to get the packet through the communications network. The flag field of each packet carries the characteristic pattern. The size of the flag field restricts the number of path choices. Thus, the flag field size of any packet can be dynamically altered to match the path choice provided by the present network routing EDI configuration. When the flag field is used in this way, this field represents the minimum number of bits required to make a routing decision based on the present choices provided by the network routing EDI(s).

The multiplexer has a data input which is coupled to the data communications network, for receiving a data frame and for steering the data frame out onto one of a plurality of destination paths based upon the enabling signal applied to the multiplexers' control inputs from the Event Driven Interface. In order to accommodate data frames whose load distribution and load balancing information lies encapsulated within the body of the data frame, a buffer can be included between the data input of the multiplexer and the network, to buffer the part or all of the data frame until sufficient logic processing of the load distribution and load balancing information is performed by the Event Driven Interface, such as is necessary to apply the appropriate enabling signal to the control input of the multiplexer. In this manner, realtime load distribution and load balancing of data frames on the data communications network, can be accomplished efficiently.

DESCRIPTION OF THE FIGURES

These and other objects, features and advantages will be more fully appreciated with reference to the accompanying figures.

DISCUSSION OF THE PREFERRED EMBODIMENT

The problem solved is how to efficiently change the routing of packets in a serial data stream to a plurality of destinations in realtime for the purpose of load balancing and load distribution.

This problem includes that of how to switch from a first node trying to communicate with a second node over two different paths when one of these paths becomes clogged with traffic.

This invention disclosure relates to the Event Driven Interface invention which is described in the copending U.S. patent application Ser. No. 08/024,575. In that patent application, the Event Driven Interface is described, which is a logic tree whose input is connected to a serial data stream. The logic tree is configured so that individual patterns of binary bits can be identified and when they are identified, they trigger a count.

In the invention disclosed in this disclosure, the Event Driven Interface has its output signal connected as a control input to a multiplexer. The input of the multiplexer is connected to the serial data stream. In this manner, the Event Driven Interface logic tree can identify individual destination address bit patterns, and output an appropriate control signal to the multiplexer, thereby switching the destination connection for the serial data stream to the intended destination location whose address is represented by the data pattern in the bit stream.

As a matter of definition, packets are referred to by other terms in the data communications industry, for example data packets can be "cells," they can be protocol data units, they can be path information units, they can be frames. These various terms refer to the same type of entity, that is a series of bits in a bit stream which are considered as a unit and routed as a unit from an origin to a destination in the network.

Figure 1:
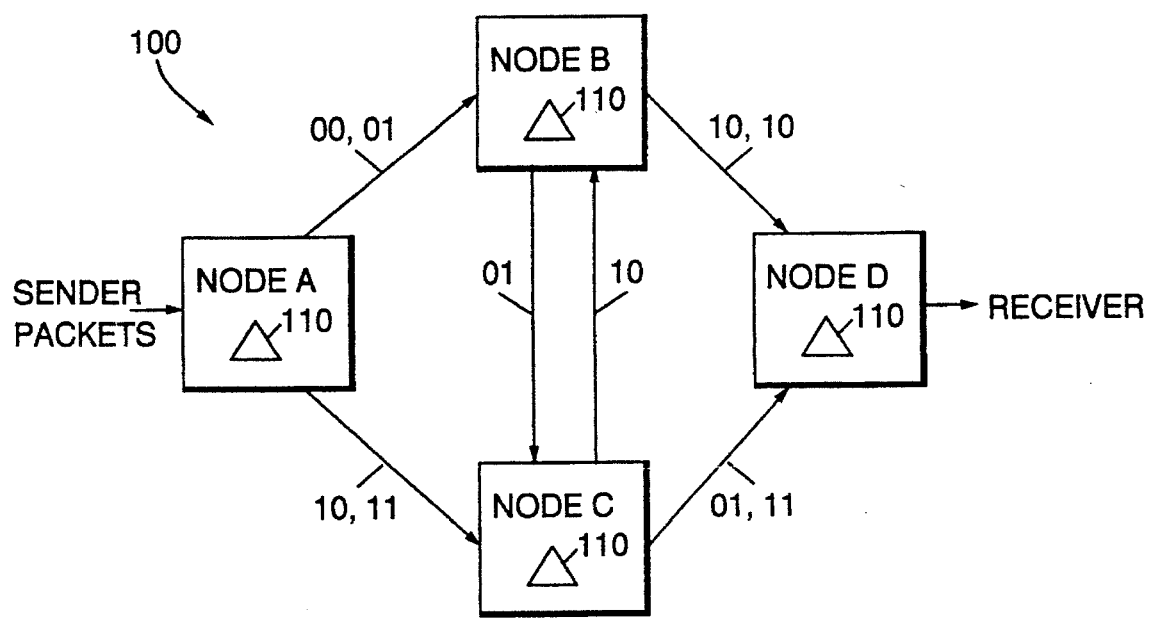
FIG. 1 is a diagram of network links and nodes having an Event Driven Interface. There are four paths identified between sender and receiver.
Figure 2:
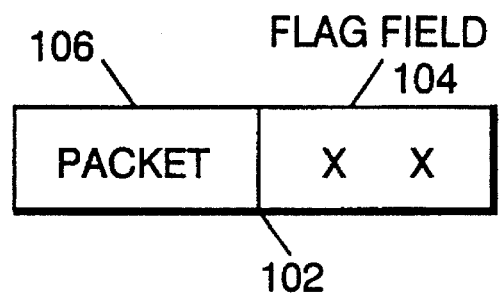
FIG. 2 shows a packet with a flag field header and a time sequence in which packets are transmitted by the sender that is connected to node A. Node status information is received by the sender that is connected to node A.

FIG. 1 shows the network 100 of four nodes with four possible paths from sender to receiver. They are path A→B→D, called path "00"; path A→B→C→D, called path "01"; path A→C→ D called path "11"; and path A→C→ B→D called path "10". FIG. 2 shows a communication sequence of data frames such as the data frame 102 which includes a flag field portion 104 and an information portion 108. In FIG. 1 each node has an Event Driven Interface (EDI) 110 with its input connected to the network 100. The Event Driven Interface is described in greater detail in the copending patent application Hershey, et al. cited above. Each respective logic path defined by the control vectors in the Event Driven Interface 110 will have a corresponding output terminal. Each corresponding output terminal will produce an enabling signal. The Event Driven Interface 110 is programmed to identify bit patterns corresponding to various routing paths such as path 00, path 01, path 10 and path 11 in FIG. 1. The flag field will have a characteristic bit pattern corresponding to each of the respective paths 00, 01, 10 and 11.

FIG. 2 also shows that packets can be transmitted along a particular network path. For example, packets 1 through 4 take path "00". After transmission of packet 4, but before transmission of packet 5, the sender receives network notification that node B is congested. The sender can then balance the network resource usage by dynamically changing the paths of the remaining packets. The remaining packets avoid node B and begin to use node C. Node B provides this notification by counting frame and byte transmissions using an EDI device. This information is reported to the sender at predetermined intervals and is compared to the known capacity of node B. With this information the sender can determine that node B is congested and can change packet routing to avoid node B. To do so, the sender can simply change the characteristic bit pattern in the flag field of one or more subsequent packet transmissions. The path chosen (in this case path "11") can be obtained through the execution of an algorithm at the sender that determines which of the three possible remaining paths to use. This choice can be made by using network information collected by EDIs at all nodes in the network. This information is either sent back to a specific "control" location or broadcast to enable all senders to make their own choice. By using a either a broadcast mechanism or redundant paths to a control location, we can avoid problems such as a first node trying to communicate with a second node over two different paths, and one of which becomes clogged with traffic. In addition, a sender or control location can respond to network load fluctuations, reported by the EDIs, by enabling another link or requesting more node resources. Furthermore, the EDIs in the nodes in the network can be reprogrammed at any time to enable the use of new paths that are created by enabling links and other network resources that increase the number of paths. If this is done, then the flag field can be increased to allow use of the new paths.

Returning to FIG. 2, packets 5 through 8 show a flag field that uses node C rather than node B. After the transmission of packet 8, node B notifies the sender that it can accommodate additional packets (i.e, if the frame and byte counts of node B drop below a pre-defined usage level then node B, which may be the "preferred" route for this sender's traffic, can be used again). The sender can send packet 9 and other packets through node B by changing the flag field, thereby balancing the usage of network resources and distributing network load among network nodes using a minimum number of bits.

Figure 3:
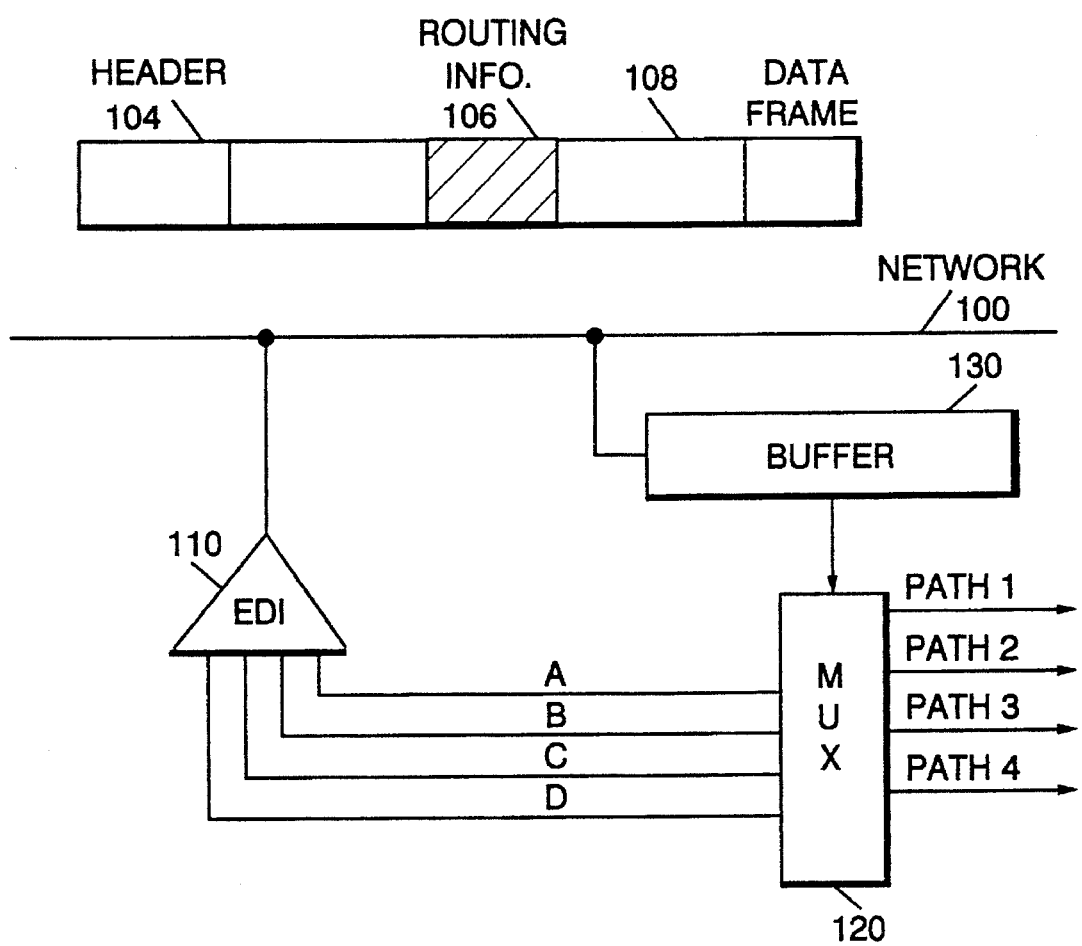
FIG. 3 is a schematic block diagram of the invention, showing the Event Driven Interface coupled to a multiplexer, for providing pasturing signals for a data frame received off the network.

FIG. 3 shows the network 100 which communicates data frames such as the data frame 102 which includes a header portion 104, a routing information portion 106 and other information portion 108. The Event Driven Interface (EDI) 110 has its input connected to the network 100. The Event Driven Interface is described in greater detail in the copending patent application Hershey, et al. cited above. Each respective logic path defined by the control vectors in the Event Driven Interface 110, will have a corresponding output terminal. Each corresponding output terminal will produce an enabling signal. The Event Driven Interface 110 is programmed to identify bit patterns corresponding to various routing paths such as path 1, path 2, path 3 and path 4 in FIG. 3. The routing information portion 106 of the data frame 102, will have a characteristic bit pattern corresponding to each of the respective paths 1, 2, 3 and 4. In accordance with the invention the Event Driven Interface 110 will identify each respective routing information bit pattern that assists with load balancing and load distribution, and produce a corresponding enabling signal on one of the enabling lines A, B, C or D which are applied to the multiplexer 120.

Also connected to the network 100 is the buffer 130 which will buffer a part or all of the data frame 102 at least until the bit pattern from the routing information 106 for load balancing and load distribution has been deciphered by the Event Driven Interface 110. The output of the buffer 130 is applied to the data input of the multiplexer 120. When a sufficient bit pattern for the load distribution and load balancing information in the data frame 102, has been deciphered by the Event Driven Interface 110, a corresponding enabling signal is output on one of the enabling lines A, B, C or D to the multiplexer 120, and at that time, the contents of the buffer 130, which contain the data frame 102, can be output on the selected one of the several paths 1, 2, 3 or 4. In this manner, realtime, inband directed routing for load balancing and load distribution of the data frame 102 can be performed using a minimum number of bits.

Although a specific embodiment of the invention has been disclosed, it will be understood by those having skill in the art that changes can be made to the specific embodiment without departing from the spirit and the scope of the invention.

What is claimed is:

1. A system for monitoring and controlling a data communications network which communicates a serial stream of binary bits having a characteristic pattern, for data frames which include load balancing and load distribution information, comprising:

at least one sending station in the network;

network of Event Driven Interfaces having inputs coupled to said at least one sending station, programmed to identify characteristic data patterns in said load distribution and load balancing information of said data frames;

means for counting frame and byte transmissions as network load information at each interface and reporting such load information to the at least one sending station for network load balancing purposes;

means for comparing the load information for each interface versus a known load capacity for each interface to determine whether an interface is congested; and means for changing the load balancing and load distribution information in frames as routing information to bypass a congested interface.

2. The apparatus of claim 1 which further comprises:

the Event Driven Interface having a plurality of outputs and programmed to identify routing patterns in said load balancing and load distribution information of said data frames, for outputting on an output line an enabling signal as frame routing information in response to identifying said load balancing and load distribution information;

a multiplexer having a plurality of control inputs coupled to said outputs of said Event Driven Interface and having a data input coupled to said data communications network for receiving said serial bit stream, and having a plurality of output paths, for outputting said serial bit stream over one of said plurality of output paths in response to said enabling signal received from said Event Driven Interface.

3. The apparatus of claim 2 which further comprises:

a data frame buffer having an input coupled to said data communications network and an output coupled to said data input of said multiplexer, for buffering said data frame until the enabling signal is received by the multiplexer.

4. A system for monitoring and controlling a data communication network which communicates a serial stream of binary bits having a characteristic pattern for data frames which include load balancing and load distribution information, comprising:

a sending station;

a receiving station;

a plurality of data transfer nodes coupled in alternative linking paths between the sending and receiving stations;

each data transfer node including a real time passive device for identifying load balancing and load distributed information in a frame processed by the node;

each device adapted to count frame and byte transmissions as load information at the node;

means for reporting the load information to a control station for determination whether a node is congested; and means for changing load balancing and load distribution information in each data frame as routing information to bypass a congested node by way of an alternative link connection to the receiving station.

5. The system of claim 4 wherein each real time, passive monitoring device generates a control signal for rerouting the serial stream of binary bits to the alternative link connection between the sending and receiving stations.

6. The system of claim 5 further including a multiplexer coupled to the output of each real time passive monitoring device for directing the control signal to the selected the alternative link connection bypassing the congested node.

7. The system of claim 6 further including a buffer coupled to the multiplexer for receiving the serial bit stream for release to the multiplexer when the control signal is provided to the multiplexer by the real time passive monitoring device.

8. The system of claim 7 wherein the real time, passive monitoring device is a programmable and digital filter.

9. The system of claim 8 wherein the programmable digital filter is an event driven interface.

10. In a system for monitoring and controlling a data communication network which communicates a serial stream of binary bits having a characteristic pattern for data frames which include load balancing and load distribution information, a method for operating said system comprising the steps of:

supplying a data packet from a sending station for transmission through a communication network including a plurality of nodes coupled to a receiving station through alternative linking paths;

sending routing information in each data packet for use by each node in routing the packets to the receiving station;

monitoring the data packets at each node for routing information and generating a control signal to direct the data packet to another node in the network;

counting the number of frames and byte transmissions at each node for load control purposes;

reporting the load information to the sending station for determination whether a node is in a congested state;

altering the routing information in each packet to bypass a node in a congested state by way of an alternative linking path; and routing the data packet at each node to the receiving station by way of the alternative linking path when bypassing a congested node.

* * * * *